Oct. 30, 1951   A. F. HESSLER ET AL   2,573,020
ARC WELDER INTERRUPTER
Filed March 1, 1950
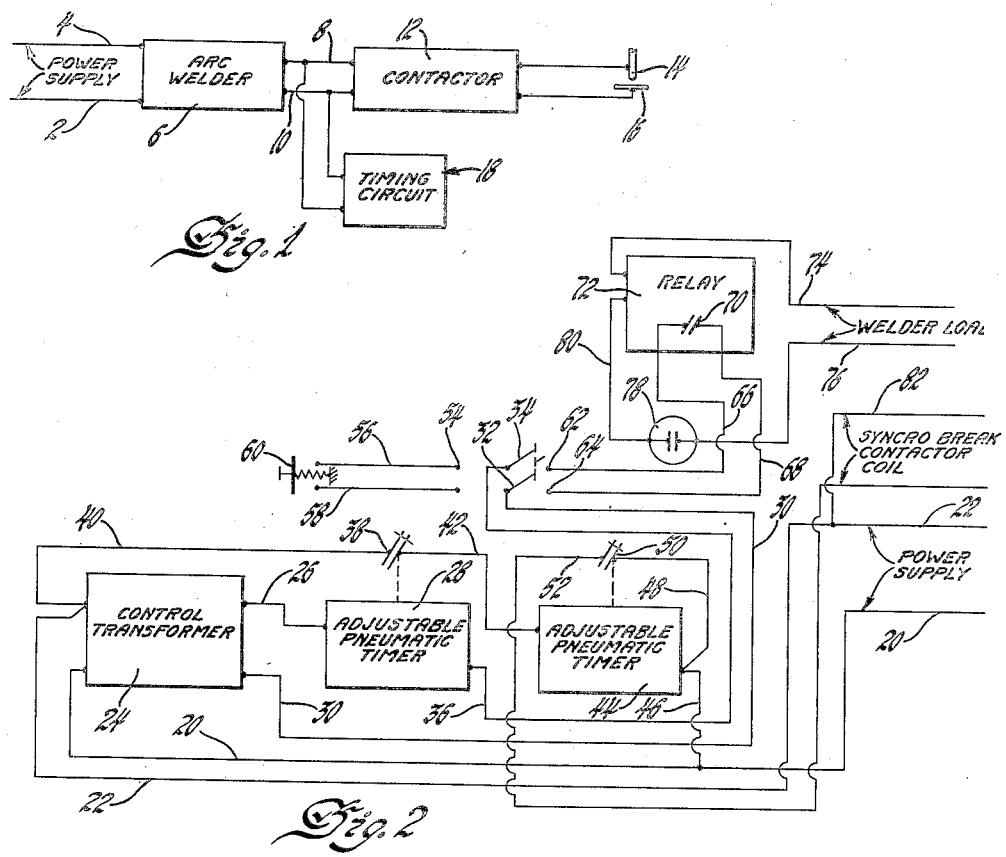
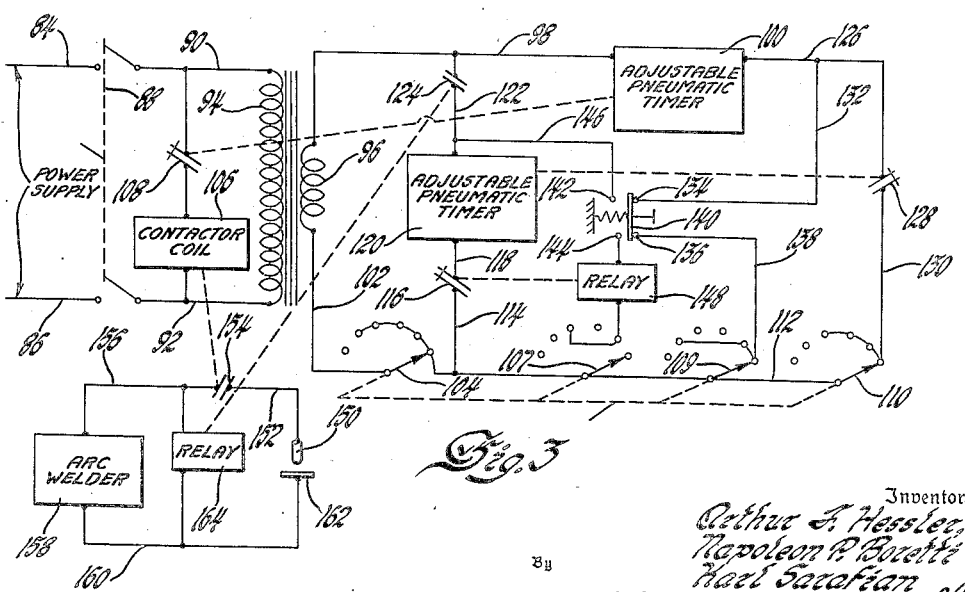
Inventors
Arthur F. Hessler,
Napoleon P. Bozetti &
Hael Sarafian
By
Willits, Helwig & Caillo
Attorneys Patented Oct. 30, 1951

2,573,020

UNITED STATES PATENT OFFICE 2,573,020

ARC WELDER INTERRUPTER

Arthur F. Hessler, Napoleon P. Boretti, and Karl Sarafian, Detroit, Mich., assignors to General Motors Corporation, Detroit, Mich., a corporation of Delaware Application March 1, 1950, Serial No. 146,978

12 Claims. (Cl. 315—246)

This invention relates to control means and specifically to welding control means in which the weld rod is manually moved over a surface to be welded. In the past it has been necessary for an operator who manually applies a welding electrode to a surface or surfaces to be welded to spend some time obtaining experience on handling the weld rod and how rapidly the weld rod should be drawn over the surface in order to properly apply the molten metal thereto in order to, first, obtain a proper weld, and second, to prevent the work from being burned. There have also more recently been instances in which instead of continuous welding, separate spaced welds were desired between parts in order to reduce the total amount of heat applied to the main junction which might cause warpage of the parts.

It is, therefore, an object of our invention to provide a control system for a manually manipulated welding electrode to automatically time the operation of the same as it is drawn across the surface.

It is a further object of our invention to provide a control system for a manually operated welding electrode which will automatically provide different timed intervals of energization and de-energization to produce spaced welds as the electrode is continuously drawn over the work.

It is a still further object of our invention to provide a welding control system which is very flexible and may be adjusted for a plurality of different types of operation.

It is a still further object of our invention to provide a welding control system which simplifies manual welding operations and reduces the amount of experience required of the operator.

With these and other objects in view which will become apparent as the specification proceeds, our invention will be best understood by reference to the following specification and claims and the illustrations in the accompanying drawings, in which:

Figure 1 is a block diagram illustrating the essential parts of our system;

Figure 2 is a schematic wiring diagram of the basic adjustable control circuit of our invention; and Figure 3 is a circuit diagram of a modified form of our control circuit which is somewhat more flexible in adjustment to different types of operation of the device.

Referring now more specifically to Figure 1, there is shown therein power supply lines 2 and 4 which supply power to the arc welder 6. The arc welder in turn is connected through lines 8 and 10 to the contractor 12 which closes the circuit to the weld rod 14, the other side of the feed line being connected to the work platform 16. Thus, when welding power is applied between 14 and 16 a weld is formed. Connected across lines 8 and 10 is a timing circuit indicated generally at 18, which timing circuit forms the basis for our invention and is best shown in detail in Figure 2. This system, while primarily intended to provide a series of adjustable time intervals for both on and off periodic periods, may also provide normal manual operation by the operator.

A suitable power supply is connected to lines 20 and 22, which lines extend directly to the input of a control transformer 24, line 26 connecting the output of the control transformer to an adjustable timer relay 28, which is shown as being a pneumatic timer, but which within the confines of our invention may be any type of adjustable timing relay switch. The other output terminal of the transformer is connected through line 30 with one blade 32 of a two-pole double-throw switch, the other movable blade 34 of which is connected through line 36 to the other side of the adjustable timer relay. This adjustable relay timer is adapted to operate switching contacts 38, which are normally closed, as shown, and are opened by energization of the relay. Contacts 38 are connected through line 40 with input line 22 and through line 42 with one terminal of a second adjustable timer relay 44, the opposite terminal of which is connected through line 46 with the input line 20. It is also connected through line 48 with one side of a pair of contacts 50, operated by the second adjustable timer relay 44, which in like manner are normally closed, and which are opened upon energization of the relay. The other side of these contacts 50 is connected through line 52 to the contactor coil 12. The other side of the contactor coil is connected directly to input line 22.

One set of stationary contacts 54 which cooperates with the double-throw switch 32, 34 is connected through lines 56, 58 to a manually closeable push button switch 60 for manual operation. A second set of stationary contacts 62, 64, which the switch 32, 34 engages in a second position, are connected through lines 66, 68 to relay contacts 70, which are normally open, and close upon energization of the relay. Relay 72 is a voltage sensitive relay and is connected through line 74 to one side of the voltage appearing on the weld rod, while line 76, connected to the other side of the weld voltage such as the base, is connected back to an indicating lamp 78 and then through line 80 to the other relay terminal.

Assuming now that the switch 32, 34 is closed on stationary contacts 62, 64 or is in what might be termed the automatic position and that previously timers 28 and 44 have been adjusted so that each provides the desired time period for the on and off portions of the cycle respectively, and lastly, that the operator has the weld rod in hand and spaced from the work, there is developed a full line voltage between the weld rod and the work. This voltage, therefore, energizes relay 72, which closes its contacts 70, which in turn completes a circuit to energize relay 28 as follows: control transformer 24, line 26, relay 28, line 36, switch arm 34, contact 62, line 66, switch 70, line 68, stationary contact 64, switch arm 32, line 30, back to the control transformer. Upon an energization of relay timer 28, it opens its contacts 38, after the preset time interval, which determines the "off" time and this deenergizes timer relay 44, which has been energized.

Upon the deenergization of timer 44, its contacts 50 immediately close, which completes a circuit to the contactor coil as follows: line 82, which is connected directly to power supply line 22; the other side of the supply line 20 continues to line 46, which is connected to line 48, through the normally closed contacts 50, line 52, which extends to the other side of the contactor. This applies power to the contactor to close for the weld. The weld rod is applied to the work and the electrode moved across the work. Now upon a creation of arc, the voltage, of course, immediately drops. This causes deenergization of relay 72, whose contacts 70 open, and this in turn deenergizes the timer relay 28. Contacts 38 immediately close, reenergizing timer relay 44, which is set now to close its contacts after a predetermined set time, which defines the "weld" time or the length of the weld.

At the end of this time period then, contacts 50 open, which breaks the circuit to the contactor coil and opens the main welding contact. The arc, therefore, is interrupted. Upon a breaking of the contactor, the terminal voltage of the welder returns to its original value, and relay 72 is again energized to close its contact 70, which in turn reenergizes adjustable timer relay 28. Again this being the same type of adjustable timer relay, the opening of contacts 38 depends upon its setting, which in turn predetermines the off time, at the end of which time contacts 38 open and the cycle is repeated. It will be obvious that through this control system the lengths of welds may be adjusted and the lengths of the spaces between welds could be adjusted and all the operator has to do is to continue to move the electrode at a constant speed across the work.

If it is desired to use the normal manual energization of the electrode, switch 32, 34 is thrown to the left position, as shown in Figure 2, and push button 60 is utilized to close the circuit to adjustable timer relay 28 instead of having that member energized by the voltage from the welder. The device may, therefore, be cycled once manually and must be recycled each time in the same manner.

Referring now to the modification of our invention, which is shown in Figure 3, as in the previous case the control circuit is fed by a power supply from lines 84 and 86. Main switch 88 is provided in this line to de-energize the same. This switch is connected through lines 90 and 92 with primary 94 of a step-down transformer, whose secondary 96 is connected through line 98 with one terminal of an adjustable timer relay 100 and through line 102 to a movable switch arm 104, which engages a plurality of stationary contacts. Connected across between lines 90 and 92 on the primary side of the transformer there is a main contactor coil 106 and a pair of normally closed contacts 108 in series. The contacts 108 are operated by the adjustable relay timer 100 as shown by the dotted lines between the two. Rotatively mounted switch arm 104 is a part of a gang switch of several arms, 107, 109 and 110, all of which move in unison, as shown by the dash line connection between them. There are six positions of this multiple switch and, as shown five of the stationary contacts which arm 104 engages are connected together conductively and to line 112, which extends on to each of the other movable switch arms.

Line 112 is also connected to a tap line 114, which extends to a pair of normally closed contacts 116 which are in turn connected through line 118 with a second adjustable timer relay 120. The opposite terminal of the timer relay 120 is connected through line 122 to a pair of normally open contacts 124 and thence to line 98. The remaining terminal of relay timer 100 is connected to line 126, which extends to a pair of normally closed contacts 128 and thence through line 130 to four of the stationary contacts engageable by switch arm 110, the remaining stationary switch points being unconnected. The normally closed contacts 128 are operated by the timer relay 120. A tap line 132 interconnects line 126 with stationary contact 134 of a manually operable switch which has a spaced and cooperating contact 136 connected by line 138 with the first two and fifth stationary contacts engageable by movable switch arm 109. The stationary contacts 134 and 136 were adapted to be bridged by conductive member 140, which is spring biased against these two spaced contacts and may be manually moved therefrom to break the circuit. A second pair of stationary contacts 142 and 144 in spaced relation to the first two are adapted to be engaged by the bridging member 140 in a second spaced position when the biasing spring for this switch is manually compressed. Contact 142 is connected through line 146 to line 122 and contact 144 is connected to a relay coil 148, the other terminal of which is connected to the second and fourth stationary contacts engageable by switch arm 107.

The direct welding electrode circuit is shown just below the primary circuit and includes a welding electrode 150 connected through line 152 to a pair of normally open contacts 154 in turn connected through line 156 to the arc welder supply system 158. The arc welder is likewise connected through line 160 to the work 162. A relay 164 is connected across lines 156 and 160 and controls the operation of the contacts 124 in the other circuit. Normally open contacts 154 are on the other hand operated by the contactor coil 106 and when they are closed power is supplied to the weld rod 150.

The purpose of the various positions of the multiple switch is to provide various different types of operation of the system. As will be noted, there are six positions of the multiple switch and if we assume that the contact which the switch is shown as engaging, is contact #1, the following are the types of operation which are produced by engaging the different switch positions. In the position shown, #1, the system is adjusted for what may be termed manual repeat operation; in position #2 the system will provide manual non-repeat operation; in position #3 it will provide automatic repeat; in position #4, automatic repeat with push button stop; in position #5 it will provide a continuous weld with push button start and stop; and in position #6 it will provide conventional arc welding.

In the operation of the system shown in Figure 3 it should first be pointed out that the two timing relays are of the delay on closing type. In other words, after energization there is a predetermined adjusted time interval before the contacts are actuated, but upon deenergization the contacts are actuated immediately. These two adjustable time delay relays are those for timing the length of the "off" time and the "weld" time, relay 120 timing the off time and relay 100 timing the weld time. Prior to any operation, of course, these adjustable relays are set to give the time period desired.

The arc welding machine 158 is, of course, first started to provide welding power, and after it has been started a supply of voltage appears across relay 164 to energize the same, and it closes its contacts 124. Multiple switch 104, 107, 109, 110 is then moved to the desired type of control, and in order to identify each, they will be taken in order, starting with position #1, which is when the switch arms are in their extreme right hand position, as shown in the drawing, which will be identified as position #1. The main switch 88 is then closed. In position #1 the operation of the system is what might be called manual repeat, meaning that the manual switch 140 is closed by the operator, but as long as it is maintained closed, the control will continue to cycle or repeat providing time intervals for the off time and weld, as determined by the adjustments on the timer relays. With the multiple switch in position #1, a circuit is completed for the timer relay 100 as follows: secondary 96, line 98, relay 100, line 126, line 132, switch 134, 140, 136, line 138, switch 109, line 112, switch 104, line 102, back to secondary 96. The energization of relay 100 will cause its contacts 108 to open and deenergize the contactor coil 106, which in turn opens contacts 154 in the welding circuit, to maintain that circuit deenergized until the proper moment.

At this time the timer relay 120 is also energized, since relay 164 has closed its contacts 124 and adjustable timer relay 120 maintains its contacts 128 open. The welding rod 150 is then placed against the work 162 and the manual switch 140 is depressed, which breaks the above traced circuit for timer relay 100, whose contacts 108, therefore, immediately close, energizing the contactor coil 106, which closes its contacts 154 and power is applied to the weld rod. Upon striking of the arc, the voltage across the weld machine terminals drops and relay 164 is deenergized, immediately opening its contacts 124 to deenergize relay 120. This causes normally closed contacts 128 to close immediately and the timer relay 100 is again energized, and it will open its normally closed contacts 108 at the termination of the time period for which it is set, thus determining the length of the weld. When it does so and opens contacts 108, the contactor coil 106 is deenergized and opens contacts 154, interrupting the arc. The terminal value of the voltage across the arc welder at once increases to energize relay coil 164, which closes its contacts and energizes the timer relay 120, which will open its contacts 128 at the end of its predetermined time period, thus measuring the off time. This cycle is repeated as long as the manual switch 140 is depressed, the two time periods being determined by the setting of the relays.

When the multiple switch is moved to position #2, the operating conditions of the system may be defined as manual non-repeat. In other words, the system will provide one complete welding period for each manual operation of the switch, regardless of how long the manual switch is held closed. The initial conditions are the same as those described for the first position, and it will be noted that the only change made by the movement of the multiple position switch is that switch arm 107 is now in position to complete a circuit through control relay 148. Timer relay 100 is energized through manual switch 140 as before, and the welding circuit is, therefore, open. The rod is again applied to the work and the manual switch 140 depressed. This breaks the circuit to the adjustable timer 100, which immediately permits its contacts 108 to close, energizing the contactor coil and completing the welding circuit through contacts 154. A circuit through adjustable timer 120 has already been created, as previously described, and it opens its contacts 128 so that there now exists no energizable circuit for the timer relay 100. Also manual switch 140 closes a circuit between stationary contacts 142 and 144 when it reaches its innermost position and this completes a circuit to relay 148, which opens its contacts 116. This causes the deenergization of relay timer 120 and it permits its contacts 128 to close, completing a circuit to relay timer 100, which will operate at the end of this predetermined set period to open contacts 108 and complete the end of the welding cycle. At this point, however, there is no circuit available to energize the off time relay 120, which is now broken at contacts 116, and, therefore, the device will not recycle. Relay 148 will remain energized until the manual switch is released, and, therefore, only one weld of a predetermined length is provided by this operation.

When the multiple switch is moved to position #3, the control will operate to automatically repeat, providing the different adjusted off and weld intervals as long as is desired. It will be noted that both switch arms 107 and 109 engage dead switch contacts and the only switch arms used are 104 and 110. When the operator is ready to begin, he merely applies a weld rod to the end of the line on which he desires a plurality of spaced welds and starts to draw the electrode along the line. At the instant prior to the application of the weld rod to the work, adjustable timer 120 is energized and adjustable timer 100 is deenergized, due to the fact that contacts 128 are open. Upon an application of the electrode 150 to the work, an arc is struck at once and the voltage across relay 164 drops, permitting contacts 124 to open and deenergizing relay timer 120, which immediately closes its normally closed contacts 128. This completes an energizing circuit for the adjustable timer 100, which is energized and will open its contacts 108 at the predetermined time interval, gauging the weld. When contacts 108 open, the contactor coil drops out, quenching the arc and energizing relay 164 which closes its contacts 124 to energize the timer 120. It, however, will not permit its normally closed contacts 128 to open for a predetermined time, thus gauging the off time. This cycle is repeated as long as the operator draws the welding rod over the work and until he removes the electrode from contact therewith. The manual switch 140 has no function in this operation.

Upon movement of the multiple switch to position #4, there is obtained an action which may be defined as automatic repeat with push button stop and is varied only in the addition of the energizing circuit for relay 148 to the system and the inclusion of that relay due to switch arm 107 contacting point #4. There will be no change in the automatic repeating of the system and it will operate exactly as it does when the multiple position switch is on position #3 until the switch 140 is manually operated and forced in, which will complete an energizing circuit for relay 148 so that the next time that switch 124 is closed by relay 164, relay 148 will be energized to open normally closed contacts 116 and prevent any further energization of the off time relay 120 to stop the system. In other words, it merely is an addition of a manual switch stop over the automatic repeat system previously described.

When the multiple switch is moved to position #5, the system operates as conventional arc welding with push button start and stop. Timer relay 100 is energized through an obvious circuit including the manual switch 140 and multiple switch arms 104 and 109. This, of course, opens normally closed contacts 108, deenergizes contactor coil 106, and opens contacts 154. When the weld rod is applied to the work, the weld period is started by pressing the manual switch 140 inwardly to break the circuit to the timer relay 100, which permits its contacts 108 to close, resulting in the completion of the welding circuit. When it is desired to stop further welding, push button 140 is released, again completing the circuit to the timer 100 and causing it to open its contacts 108 to cause a cessation of welding current. In this particular phase of operation, of course, the time delay factor of the timer relay 100 is not important and it is set to a minimum duration so that the welding action is terminated as soon after the release of switch 140 as possible.

When the multiple position switch is moved to its last position, #6, the timer relays are deenergized entirely, which means that relay contacts 108 will remain closed at all times, the contactor coil will remain energized, and the welding circuit will also be completed, resulting in conventional arc welding.

It will thus be obvious from the above discussion that we have provided a very flexible and simple control system for arc welding which provides a multiplicity of different types of operation for various projects.

We claim:

1. In a control system for welding means, a source of power, a welding electrode, switching means connected between the source and electrode to control the application of power thereto, a plurality of time delay relay means connected in sequence and to the power source, a second switching means operated by the final time delay relay and connected to control the first switching means, a control relay connected across one of the time delay relays and manual switching means connected in circuit with said control relay to determine the character of operation of the control system so that the timed sequence may be initiated manually.

2. In a control system for welding means, a source of power, a welding electrode, switching means connected between the source and electrode to control the application of power thereto, a plurality of time delay relay means connected in sequence and to the power source, a second switching means operated by the final time delay relay and connected to control the first switching means, a control relay connected across one of the time delay relays and a plurality of manual ganged switching means connected in circuit with each of the time delay relays and with the control relay to alter the type of operation of the system.

3. In a control system for welding means, a source of power, a welding electrode, switching means connected between the source and electrode to control the application of power thereto, a plurality of time delay relay means connected in sequence and to the power source, a second switching means operated by the final time delay relay and connected to control the first switching means, a control relay connected across one of the time delay relays, a manual switch in circuit with the control relay and a multi-position multi-arm switch whose arms are in circuit with each of the time delay relays and the control relay so that the multi-position switch may be initially set to determine the type of operation and the manual switch to determine the operative cycles if it is included in the system.

4. In a control system for a load to which it is desired to supply intermittent pulses of power of adjustable timed length, a source of power, a load, voltage responsive relay means connected across the load, a plurality of adjustable timed relay means connected in sequence between the source of power and load, the last timed control relay means controlling the power to the load, conductive means connecting the voltage responsive relay means in the circuit to the first timed relay to control its operation and manually operable switching means connected in the conductive means to provide either manual or voltage responsive relay means to control the timed relay means in producing intermittent pulses of power.

5. In a control system for welding means, a source of power, a welding electrode connected thereto, contactor switching means interposed between the source and electrode to control the application of power thereto, a plurality of adjustably timed relay means connected in sequence and to the source of power, said last timed relay connected to the contactor switching circuit to control the operation thereof, a voltage responsive relay connected to the welding electrode and affected by the arc voltage connected in the circuit to the first timed relay to control the same and manually operable switching means connected between the voltage responsive relay and the first timed relay to provide either manual or voltage responsive relay control for the timed relay means.

6. In a control system for welding means, a power supply, a welding electrode, contactor switching means connected between the power supply and the electrode to control the energized periods thereof, a pair of adjustable time delay relays connected in sequence, the first controlling the second, switching means operated by the second relay connected in circuit with the contactor switching means to control the same, voltage responsive relay means having its contacts in circuit with the first time delay relay and connected to the welding electrode and sensitive to the arc voltage for controlling the operation of the first time delay relay and manually operable switching means in the circuit between the contacts of the voltage responsive relay and the first time delay relay to provide either manual or voltage responsive relay control for the timed relay.

7. In a control system for welding means, a source of power, a welding electrode, a first switching means to control the application of power to the electrode from the source connected therebetween, transformer means having a primary and secondary, the primary being connected to the power source, a pair of time delay relay means connected in parallel across the secondary of the transformer, second switching means actuated by the first time delay relay connected in the circuit of the second time delay relay to control the operation thereof, third switching means actuated by the second time delay relay and connected in circuit with and controlling the operation of the first named switching means, voltage responsive relay means connected to the welding electrode, and a fourth switching means actuated by the voltage responsive means connected in circuit with the first time delay relay to control the same.

8. In a control system for welding means, a power supply, a welding electrode, contactor switching means connected between the power supply and the electrode to control the energized periods thereof, a pair of adjustable time delay relays connected in sequence, the first controlling the second, switching means operated by the second relay connected in circuit with the contactor switching means to control the same, voltage responsive relay means having its contacts in circuit with the first time delay relay and connected to the welding electrode, sensitive to the arc voltage for controlling the operation of the first time delay relay, a control relay connected in shunt circuit around the first time delay relay, switching means operated by said control relay in circuit with the first time delay relay and being normally closed, and manually operable switching means to introduce or remove the last named control relay from the system.

9. In a control system for welding means, a source of power, a welding electrode, a first switching means to control the application of power to the electrode from the source connected therebetween, transformer means having a primary and secondary, the primary being connected to the power source, a pair of time delay relay means connected in parallel across the secondary of the transformer, second switching means actuated by the first time delay relay connected in the circuit of the second time delay relay to control the operation thereof, third switching means actuated by the second time delay relay and connected in circuit with and controlling the operation of the first named switching means, voltage responsive relay means connected to the welding electrode, a fourth switching means actuated by the voltage responsive means connected in circuit with the first time delay relay to control the same, a control relay connected in shunt circuit around the first time delay relay, switching means operated by said control relay in circuit with the first time delay relay and being normally closed, and manually operable switching means to introduce or remove the last named control relay from the system.

10. In a control system for welding means, a power supply, a welding electrode, contactor switching means connected between the power supply and the electrode to control the energized periods thereof, a pair of adjustable time delay relays connected in sequence, the first controlling the second, switching means operated by the second relay connected in circuit with the contactor switching means to control the same, voltage responsive relay means having its contacts in circuit with the first time delay relay and connected to the welding electrode and sensitive to the arc voltage for controlling the operation of the first time delay relay, a control relay connected in shunt circuit around the first time delay relay, switching means operated by said control relay in circuit with the first time delay relay and being normally closed, and multi-position multi-pole manually operative switching means connected in circuit with each of the time delay relays and with the last named control relay to vary the operation of the system for different types of application.

11. In a control system for welding means, a power supply, a welding electrode, contactor switching means connected between the power supply and the electrode to control the energized periods thereof, a pair of adjustable time delay relays connected in sequence, the first controlling the second, switching means operated by the second relay connected in circuit with the contactor switching means to control the same, voltage responsive relay means having its contacts in circuit with the first time delay relay and connected to the welding electrode and sensitive to the arc voltage for controlling the operation of the first time delay relay, a control relay connected in shunt circuit around the first time delay relay, switching means operated by said control relay in circuit with the first time delay relay and being normally closed, multi-position multi-pole manually operative switching means connected in circuit with each of the time delay relays and with the last named control relay to vary the operation of the system for different types of application and a biased manually operated switch for additional manual control of the system.

12. In a control system for welding means, a source of power, a welding electrode, a first switching means to control the application of power to the electrode from the source connected therebetween, transformer means having a primary and secondary, the primary being connected to the power source, a pair of time delay relay means connected in parallel across the secondary of the transformer, second switching means actuated by the first time delay relay connected in the circuit of the second time delay relay to control the operation thereof, third switching means actuated by the second time delay relay and connected in circuit with and controlling the operation of the first named switching means, voltage responsive relay means connected to the welding electrode, a fourth switching means actuated by the voltage responsive means connected in circuit with the first time delay relay to control the same, a control relay connected in shunt circuit around the first time delay relay, switching means operated by said control relay in circuit with the first time delay relay and being normally closed, multi-position multi-pole manually operative switching means connected in circuit with each of the time delay relays and with the last named control relay to vary the operation of the system for different types of application, and a biased manually operated switch for additional manual operation of the system.

ARTHUR F. HESSLER.
NAPOLEON P. BORETTI.
KARL SARAFIAN.

REFERENCES CITED

The following references are of record in the file of this patent:

UNITED STATES PATENTS

| Number | Name | Date |
|---|---|---|
| 2,460,990 | Kratz | Feb. 8, 1949 |